United States Patent
Ooshima et al.

(10) Patent No.: US 10,982,756 B2
(45) Date of Patent: Apr. 20, 2021

(54) VEHICLE CONTROL DEVICE

(71) Applicant: ISUZU MOTORS LIMITED, Tokyo (JP)

(72) Inventors: Tatsuya Ooshima, Saitama (JP); Nobuyuki Nishimura, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 10 days.

(21) Appl. No.: 16/613,092

(22) PCT Filed: May 10, 2018

(86) PCT No.: PCT/JP2018/018066
§ 371 (c)(1),
(2) Date: Nov. 12, 2019

(87) PCT Pub. No.: WO2018/207860
PCT Pub. Date: Nov. 15, 2018

(65) Prior Publication Data
US 2021/0088131 A1   Mar. 25, 2021

(30) Foreign Application Priority Data
May 12, 2017  (JP) .............................. JP2017-095970

(51) Int. Cl.
| | |
|---|---|
| *F16H 59/44* | (2006.01) |
| *F16H 61/02* | (2006.01) |
| *F16H 59/66* | (2006.01) |

(52) U.S. Cl.
CPC ......... *F16H 61/0213* (2013.01); *F16H 59/44* (2013.01); *F16H 59/66* (2013.01); *F16H 2059/663* (2013.01)

(58) Field of Classification Search
CPC .... F16H 59/44; F16H 59/66; F16H 2059/663; F16H 2061/0012; F16H 2061/0015;
(Continued)

(56) References Cited

U.S. PATENT DOCUMENTS 5,832,400 A * 11/1998 Takahashi ......... B60W 30/1819
701/53
5,931,886 A   8/1999 Moroto et al.
(Continued)

FOREIGN PATENT DOCUMENTS

| CN | 104395647 A | 3/2015 |
| CN | 104653760 A | 5/2015 |

(Continued)

OTHER PUBLICATIONS

Office Action for related CN App. No. 201880030975.5 dated Jul. 3, 2020. English translation provided; 13 pages.
(Continued)

*Primary Examiner* — Edwin A Young
(74) *Attorney, Agent, or Firm* — Procopio, Cory, Hargreaves & Savitch LLP

(57) ABSTRACT

In a case where a vehicle is in a first mode in which suppression of fuel consumption is prioritized, a forward gear stage selection unit selects as a forward gear stage a gear stage at which a minimum travelable vehicle speed, which is a minimum speed among a speed of the vehicle at which a driving force indicated by a driving force characteristic is equal to or greater than a travel resistance of a travel resistance characteristic, is highest, and in a case where the vehicle is in a second mode in which improvement of travel performance is prioritized, the forward gear stage selection unit selects as the forward gear stage a gear stage at which a maximum travelable vehicle speed, which is a maximum speed among the speed of the vehicle at which the driving force is equal to or greater than the travel resistance, is highest.

3 Claims, 7 Drawing Sheets

(58) Field of Classification Search
CPC ..... F16H 2061/0227; F16H 2061/0234; F16H 61/16; F16H 61/0213
See application file for complete search history.

(56) References Cited

U.S. PATENT DOCUMENTS

| | | | |
|---|---|---|---|
| 6,070,118 A | 5/2000 | Ohta et al. | |
| 10,124,806 B2 * | 11/2018 | Raffone | ................. G01G 19/08 |
| 2010/0256883 A1 * | 10/2010 | Sauter | ................. F16H 61/0213 |
| | | | 701/65 |
| 2011/0172877 A1 * | 7/2011 | Dourra | ................. F16H 59/66 |
| | | | 701/33.4 |
| 2012/0220422 A1 * | 8/2012 | Wurthner | ............. B60W 10/02 |
| | | | 477/79 |

FOREIGN PATENT DOCUMENTS

| | | |
|---|---|---|
| CN | 104976337 A | 10/2015 |
| EP | 2540548 A1 | 1/2013 |
| JP | S62-170444 U | 10/1987 |
| JP | H06-193723 A | 7/1994 |
| JP | H09-21457 A | 1/1997 |
| JP | H09-303544 A | 11/1997 |
| JP | H10-169765 A | 6/1998 |
| WO | 2011-101996 A1 | 8/2011 |

OTHER PUBLICATIONS

International Search Report and Written Opinion for related International Application No. PCT/JP2018/018066, dated Jul. 31, 2018; English translation of ISR provided (9 pages).

* cited by examiner

VEHICLE CONTROL DEVICE

CROSS-REFERENCE TO RELATED APPLICATIONS

This application is a U.S. National Stage entry of PCT Application No: PCT/JP2018/018066 filed on May 10, 2018, which claims priority to Japanese Patent Application No. 2017-095970, filed May 12, 2017, the contents of which are incorporated herein by reference.

TECHNICAL FIELD

The present disclosure relates to a vehicle control device.

BACKGROUND ART

There has been a technique of setting a shift schedule that minimizes fuel consumption in a travel route based on road information in the travel route from a current position to a target position of a vehicle and a driving force of the vehicle in the travel route (see, for example, Patent Literature 1).

CITATION LIST

Patent Literature

Patent Literature 1: JP-A-H09-21457

SUMMARY OF INVENTION

Technical Problem

Incidentally, a vehicle may have a first mode in which fuel consumption is prioritized and a second mode in which traveling performance is prioritized. When the vehicle selects the gear stage in the same manner in each of the modes, there is a problem that the vehicle cannot travel suitably for each of the modes.

Particularly, if the vehicle selects the gear stages of the forward travel section ahead in a travel direction in the same manner in each of the modes and shifts the selected gear stage at the time of entering the forward travel section, there is a problem that the speed becomes smaller than a state assumed in the mode in which the travel performance is prioritized, or the fuel consumption is increased than a state assumed in the mode in which the fuel consumption is prioritized.

The present disclosure is made in view of the above circumstances, and an object thereof is to provide a vehicle control device capable of selecting a gear stage suitable for a travel mode of a vehicle.

Solution to Problem

An aspect of the present disclosure is a vehicle control device. The device includes: a travel section determination unit configured to determine a forward travel section that is a travel section having a different road gradient from a current travel section in which a vehicle is currently traveling and that is ahead in a travel direction of the vehicle; a forward gear stage selection unit configured to select a forward gear stage, which is a gear stage of the vehicle in the forward travel section, based on: a driving force characteristic indicating a relationship between a speed of the vehicle and a driving force of the vehicle of each of a plurality of gear stages of the vehicle; and a travel resistance characteristic indicating a relationship between the speed of the vehicle and a travel resistance of the vehicle corresponding to the forward travel section; and a shift control unit configured to control shift of the gear stage of the vehicle in the forward travel section based on the forward gear stage selected by the forward gear stage selection unit, and in a case where a travel mode of the vehicle is a first mode in which suppression of fuel consumption is prioritized, the forward gear stage selection unit is configured to select as the forward gear stage a gear stage at which a minimum travelable vehicle speed, which is a minimum speed among the speed of the vehicle at which the driving force indicated by the driving force characteristic is equal to or greater than the travel resistance indicated by the travel resistance characteristic, is highest, and in a case where the travel mode of the vehicle is a second mode in which improvement of travel performance is prioritized, the forward gear stage selection unit is configured to select as the forward gear stage a gear stage at which a maximum travelable vehicle speed, which is a maximum speed among the speed of the vehicle at which the driving force indicated by the driving force characteristic is equal to or greater than the travel resistance indicated by the travel resistance characteristic, is highest.

The shift control unit may be configured to, in a case where the forward gear stage selected by the forward gear stage selection unit is lower than a current gear stage which is a gear stage of the vehicle in a current travel state of the vehicle and when the vehicle is positioned within a predetermined range with respect to a start position of the forward travel section, control shift of the gear stage so as to downshift from the current gear stage to the forward gear stage.

The vehicle control device may further include a current gear stage selection unit configured to select a current gear stage, which is a gear stage of the vehicle in a current travel state of the vehicle, based on the travel resistance of the vehicle, and in a case where the current gear stage selection unit newly selects a target gear stage lower than the current gear stage while the vehicle is traveling in the current travel section at the current gear stage, the shift control unit may be configured to: control shift of the gear stage so as to prevent downshift from the current gear stage to the target gear stage and to maintain the current gear stage, when the driving force of the vehicle corresponding to the current gear stage exceeds the travel resistance of the vehicle in the forward travel section so that the vehicle is capable of traveling in the forward travel section at the current gear stage, and a stall amount of the vehicle in a case where the vehicle travels in the current travel section at the current gear stage is equal to or smaller than a predetermined threshold value, and control shift of the gear stage so as to downshift from the current gear stage to the target gear stage without preventing the downshift in a case where the forward gear stage selected by the forward gear stage selection unit is lower than the current gear stage.

Advantageous Effects of Invention

According to the present disclosure, it is possible to select a gear stage suitable for a travel mode of a vehicle.

DESCRIPTION OF EMBODIMENTS

Outline of Vehicle According to an Embodiment

An outline of a vehicle V according to an embodiment will be described with reference to FIG. 1.

Figure 1:
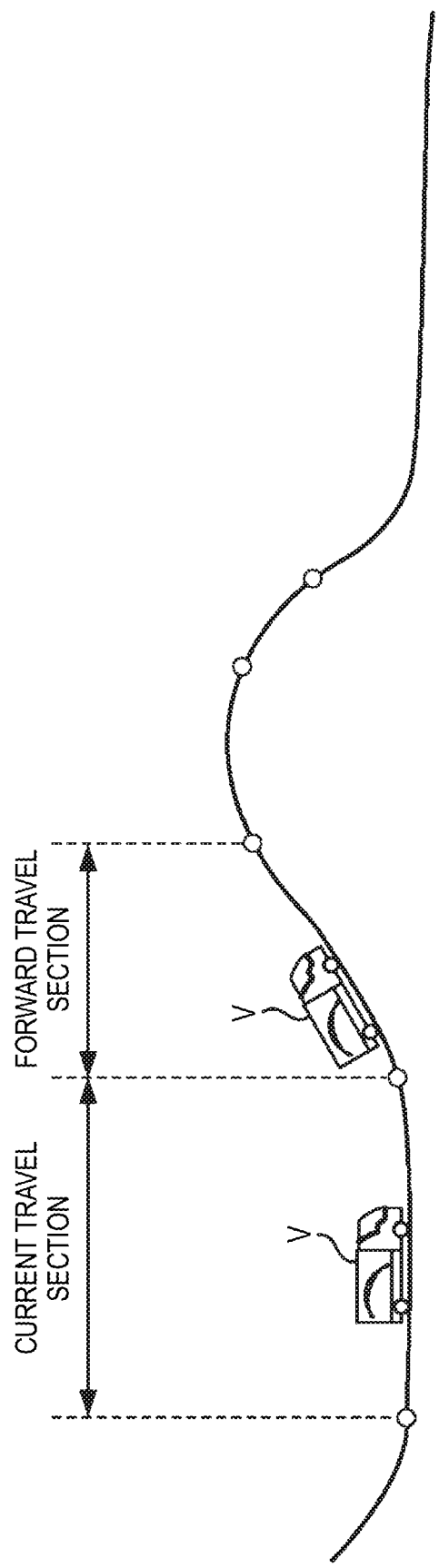
FIG. 1 is a diagram illustrating an outline of a vehicle according to an embodiment.

FIG. 1 is a diagram illustrating the outline of the vehicle V according to the embodiment.

The vehicle V travels in either mode of an economy mode as a first mode and a power mode as a second mode. The economy mode is a mode of travel that prefers suppression of fuel consumption of the vehicle V. The power mode is a mode of travel that prefers improvement of travel performance of the vehicle V.

The vehicle V selects a current gear stage, which is a gear stage of the vehicle V in a current travel state of itself (hereinafter referred to as the current travel state), and selects a forward gear stage, which is a gear stage of the vehicle V in a forward travel section ahead in a travel direction of itself. In a case where the vehicle selects the current gear stage and the forward gear stage, the vehicle V selects the gear stages in different manners in each of an economy mode and a power mode. In this way, the vehicle V can select a gear stage suitable for the travel mode of the vehicle. Hereinafter, the vehicle V will be described in detail.

Vehicle Configuration According to an Embodiment

A configuration of the vehicle V according to the embodiment will be described with reference to FIG. 2.

Figure 2:
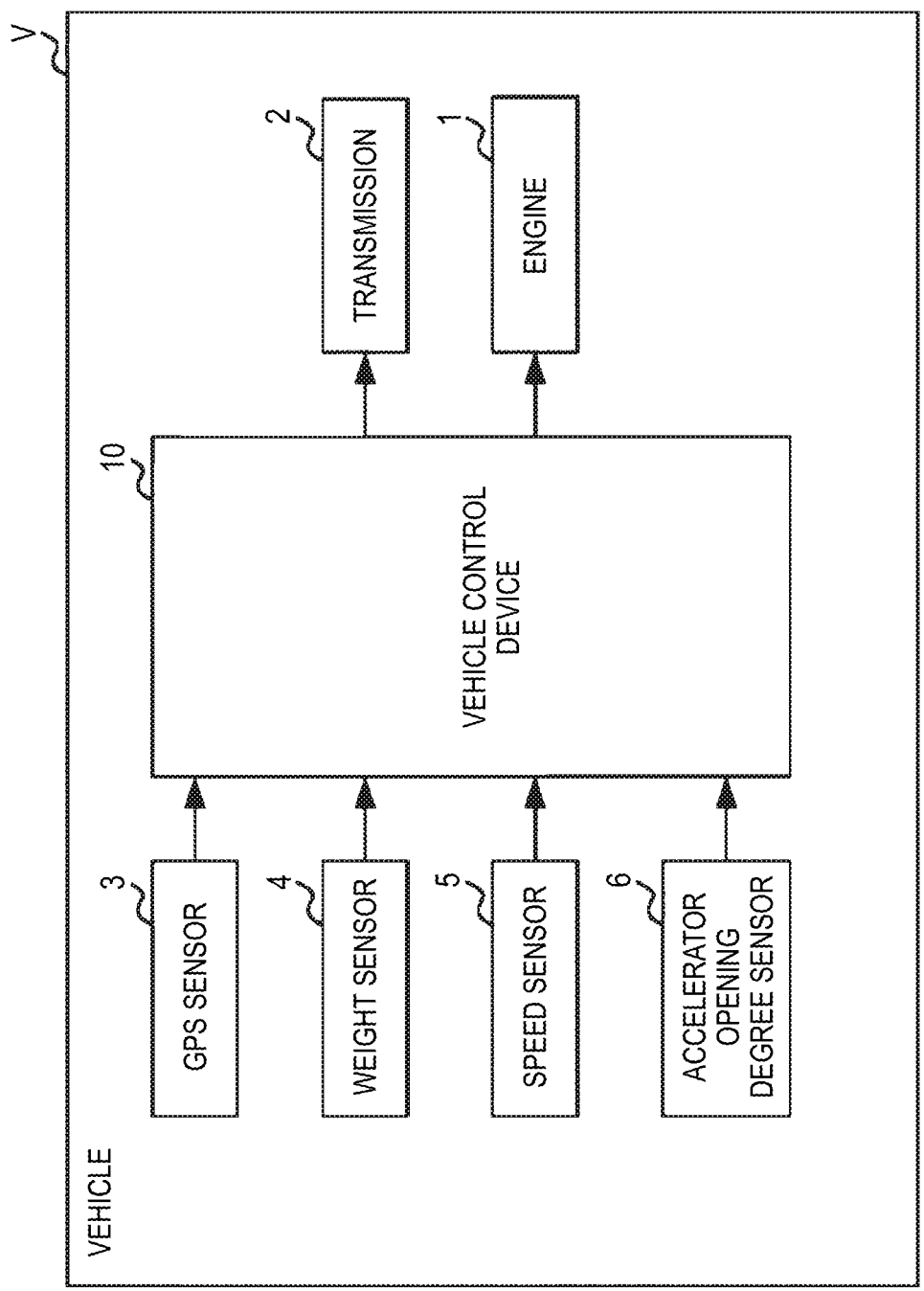
FIG. 2 is a diagram schematically showing an internal configuration of the vehicle according to the embodiment.

FIG. 2 is a diagram schematically showing an internal configuration of the vehicle V according to the embodiment. The vehicle V according to the embodiment includes an engine 1, a transmission 2, a global positioning system (GPS) sensor 3, a weight sensor 4, a speed sensor 5, an accelerator opening degree sensor 6, and the vehicle control device 10.

The vehicle V is a large vehicle that uses the engine 1 such as a diesel engine as a driving force, and is, in particular, a vehicle that is mounted with an automatic cruise mode. The transmission 2 transmits a rotational driving force of the engine 1 to a drive wheel (not shown) of the vehicle V. The transmission 2 includes a plurality of stages of gears for converting the rotational driving force of the engine 1.

Here, the "automatic cruise mode" in the vehicle V refers to a mode in which the engine 1, the transmission 2, and the like are automatically controlled by the vehicle control device 10 so as to maintain the speed of the vehicle V set in advance even if the driver does not operate an accelerator or a shift lever. The automatic cruise mode is mainly assumed to be used when the vehicle V travels on a highway.

The GPS sensor 3 receives and analyzes radio waves transmitted from a plurality of navigation satellites so as to acquire a position of the GPS sensor 3, that is, a position of the vehicle V on which the GPS sensor 3 is mounted. The GPS sensor 3 outputs information indicating the position of the vehicle V to the vehicle control device 10.

The weight sensor 4 acquires a total weight of the vehicle V. Specifically, the weight sensor 4 measures a weight of load on the vehicle V, and sums the weight with a weight of the vehicle V alone excluding the load so as to acquire the total weight of the vehicle V. The weight sensor 4 outputs information indicating the total weight of the vehicle V to the vehicle control device 10.

The speed sensor 5 measures the speed of the vehicle V. The speed sensor 5 outputs information indicating the measured speed to the vehicle control device 10. The accelerator opening degree sensor 6 measures an accelerator opening degree which is a depression amount of an accelerator pedal by the driver of the vehicle V. The accelerator opening degree sensor 6 outputs information indicating the accelerator opening degree to the vehicle control device 10.

The vehicle control device 10 acquires the information from the sensors described above, and controls an amount of fuel to be supplied to a cylinder in the engine 1 and the gear stage of the transmission 2 based on the acquired information. In a case where the vehicle V is in the automatic cruise mode, the vehicle control device 10 controls the engine 1 and the transmission 2 so that the vehicle V travels while maintaining the set speed. In a case where a speed limit device (SLD) of the vehicle V is operating, the vehicle control device 10 controls the engine 1 and the transmission 2 so that the speed of the vehicle V does not exceed a set upper limit speed.

In a case where the vehicle V is the economy mode, the vehicle control device 10 controls the engine 1 and the transmission 2 by preferring a lower fuel consumption. In a case where the vehicle V is the power mode, the vehicle control device 10 controls the engine 1 and the transmission 2 by preferring a higher travel performance.

Configuration of Vehicle Control Device 10 According to an Embodiment

Next, a configuration of the vehicle control device 10 according to an embodiment will be described with reference to FIG. 3.

Figure 3:
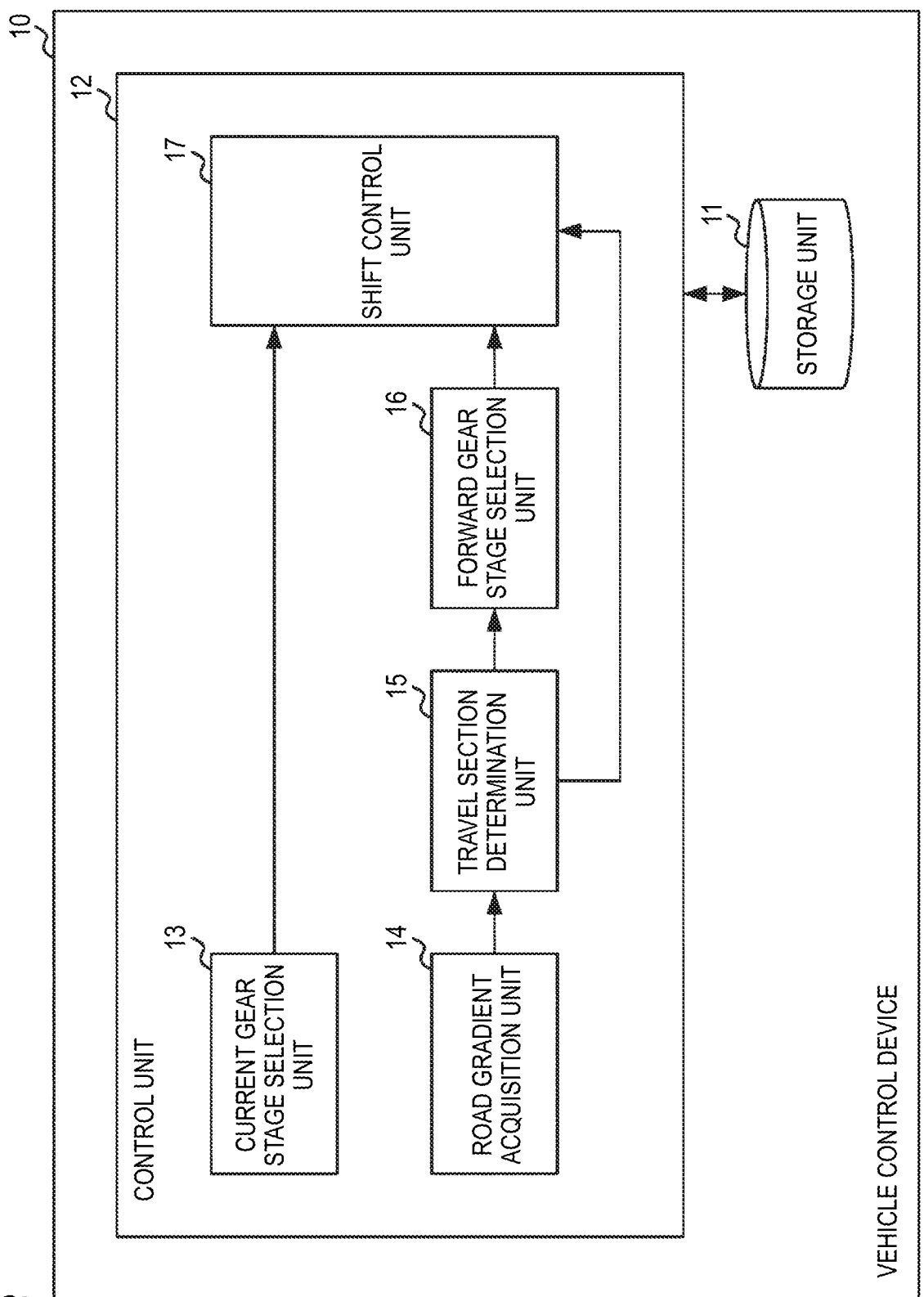
FIG. 3 is a diagram illustrating a configuration of a vehicle control device according to the embodiment.

FIG. 3 is a diagram illustrating the configuration of the vehicle control device 10 according to the embodiment. The vehicle control device 10 according to the embodiment includes a storage unit 11 and a control unit 12.

The storage unit 11 is, for example, a read only memory (ROM) or a random access memory (RAM). The storage unit 11 stores various programs for causing the control unit 12 to function.

The control unit 12 is a calculation resource including a processor such as a central processing unit (CPU) (not shown). The control unit 12 implements functions of a current gear stage selection unit 13, a road gradient acquisition unit 14, a travel section determination unit 15, a forward gear stage selection unit 16, and a shift control unit 17 by executing programs stored in the storage unit 11.

The current gear stage selection unit 13 calculates a net average effective pressure PmeR of the engine 1 corresponding to a travel resistance of the vehicle V in the current travel state every predetermined time, and calculates a net average effective pressure Pme of each gear stage based on the calculated net average effective pressure PmeR. The net average effective pressure Pme of each gear stage is a minimum torque required for maintaining the current travel state. The current gear stage selection unit 13 selects the current gear stage, which is a gear stage of the transmission 2 in the current travel state of the vehicle V, by using the calculated net average effective pressure Pme of each gear stage and an engine rotational speed in a case of shifting to each gear stage, and by referring to an iso-fuel consumption map and a maximum torque map PmeMAX.

Specifically, first, the current gear stage selection unit 13 calculates the net average effective pressure PmeR of the engine 1 corresponding to the travel resistance in the current travel state. The current gear stage selection unit 13 calculates the net average effective pressure Pme of the engine 1 from a torque generated by the engine 1. The current gear stage selection unit 13 calculates the net average effective pressure PmeR corresponding to the travel resistance of the engine 1 from the calculated net average effective pressure Pme, a vehicle weight, a gear ratio of the gear stage selected by the transmission 2, a final deceleration ratio, a transmission efficiency, an engine exhaust amount, a wheel radius, and an acceleration of the vehicle V. The current gear stage selection unit 13 calculates in each gear stage the net average effective pressure Pme, which is the minimum torque required for maintaining the current travel state, and the engine rotational speed, based on the calculated net average effective pressure PmeR, and creates an iso-horsepower diagram. The current gear stage selection unit 13 selects a gear stage having the best fuel efficiency by referring to the iso-horsepower diagram, the maximum torque map PmeMAX, and the iso-fuel consumption map. The current gear stage selection unit 13 may calculate the net average effective pressure PmeR corresponding to the travel resistance based on a road gradient on the road on which the vehicle V is currently traveling, which is acquired by the road gradient acquisition unit 14.

Based on the information indicating the position of the vehicle V acquired from the GPS sensor 3 and map information stored in the storage unit 11, the road gradient acquisition unit 14 acquires the road gradient on the road on which the vehicle V is currently traveling. For example, the road gradient acquisition unit 14 acquires the road gradient from the position of the vehicle V to a position ahead by a predetermined distance (for example, 500 in).

The travel section determination unit 15 determines a forward travel section that is ahead in the travel direction of the vehicle V and that is a travel section having a different road gradient from a current travel section in which the vehicle is currently traveling based on the road gradient acquired by the road gradient acquisition unit 14.

The forward gear stage selection unit 16 selects the forward gear stage, which is a gear stage of the transmission 2 in the forward travel section, based on the road gradient of the forward travel section. Specifically, first, the forward gear stage selection section 16 calculates the travel resistance of the forward travel section based on a rolling resistance of the drive wheel of the vehicle V, an air resistance of the vehicle V, and a gradient resistance of the forward travel section.

Subsequently, the forward gear stage selection unit 16 specifies the forward gear stage based on driving force characteristic information indicating the relationship between the speed and the driving force of the vehicle V of each of the plurality of gear stages of the vehicle V stored in the storage unit 11 and the calculated travel resistance of the forward travel section.

Figure 4:
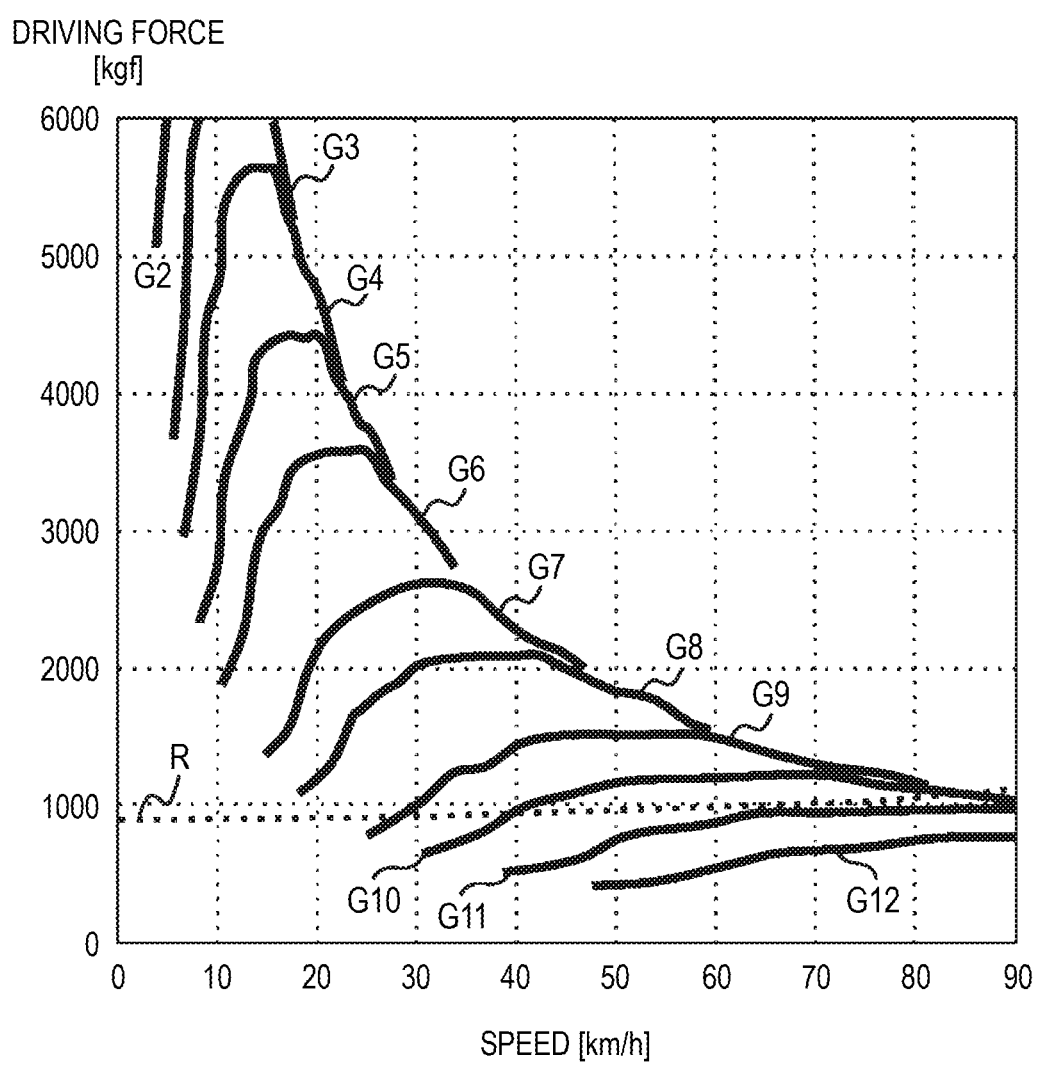
FIG. 4 is a travel performance diagram of the vehicle according to the embodiment.
Figure 5:
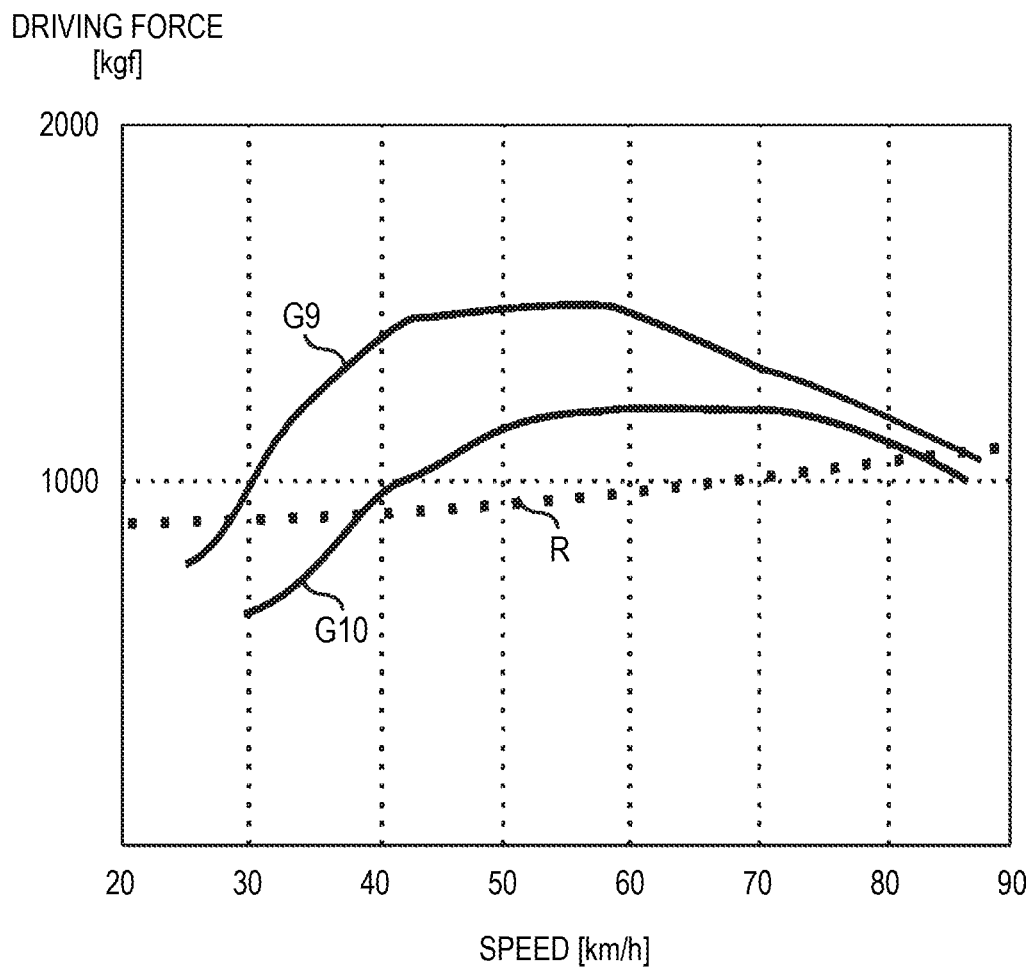
FIG. 5 is a diagram illustrating a part of the travel performance diagram shown in FIG. 4.

FIG. 4 is a travel performance diagram of the vehicle V corresponding to the driving force characteristic information according to the embodiment. FIG. 4 shows driving force characteristics G2 to G12 indicating the relationship between the driving force of the vehicle V and the speed in each of second to twelfth stages as the plurality of gear stages. FIG. 4 furthers shows a travel resistance characteristic R indicating the relationship between the speed of the vehicle V and the travel resistance corresponding to the forward travel section. FIG. 5 is a diagram illustrating a part of the travel performance diagram shown in FIG. 4. FIG. 5 shows the ninth and tenth driving force characteristics G9 and G10 and the travel resistance characteristic R corresponding to the forward travel section.

The forward gear stage selection unit 16 selects a gear stage in which the driving force of the vehicle V becomes greater than the travel resistance of the vehicle V in the forward traveling section as the forward gear stage, based on the driving force characteristics respectively corresponding to the plurality of gear stages.

The forward gear stage selection unit 16 selects the gear stages in different manners in cases where the travel mode of the vehicle V is the economy mode and the power mode. First, a selection example of the gear stage in the case of the economy mode will be described.

In the case where the travel mode of the vehicle V is the economy mode, for each of the plurality of gear stages at which the vehicle can travel in the forward travel section, the forward gear stage selection unit 16 specifies a minimum travelable vehicle speed, which is a minimum speed among the speed at which the vehicle V can travel.

Specifically, for the driving force characteristic of each of the plurality of gear stages, the forward gear stage selection unit 16 specifies a minimum speed among the speed of the vehicle V, at which the driving force indicated by the driving force characteristic is equal to or greater than the travel resistance indicated by the travel resistance characteristic corresponding to the forward travel section, as the minimum travelable vehicle speed. The forward gear stage selection unit 16 specifies a lowest speed among the speed, at which the driving force indicated by the driving force characteristic and the travel resistance indicated by the travel resistance characteristic coincide with each other, as the minimum travelable vehicle speed. In a case where the driving force exceeds the travel resistance at each speed and thus the driving force and the traveling resistance do not coincide with each other, the forward gear stage selection unit 16 specifies a minimum speed of the vehicle V indicated by the driving force characteristic as the minimum travelable vehicle speed. In the example shown in FIG. 5, for the eighth stage, the forward gear stage selection unit 16 specifies the minimum travelable vehicle speed as 18 km/h.

The forward gear stage selection unit 16 selects a gear stage having a highest minimum travelable vehicle speed and a low driving force characteristic (a highest travelable gear stage) among the plurality of gear stages as the forward gear stage. Thereby, the forward gear stage selection unit 16 can select the highest travelable gear stage in the economy mode.

For example, the forward gear stage selection unit 16 selects the tenth and lower stages as a gear stage at which the vehicle can travel in the forward traveling section. For the ninth stage, the forward gear stage selection unit 16 specifies a lowest speed among the speed of the vehicle V, at which the driving force indicated by the driving force characteristic and the travel characteristic indicated by the travel resistance characteristic R corresponding to the forward travel section coincide with each other, as the minimum travelable vehicle speed. In the example shown in FIG. 5, the forward gear stage selection unit 16 specifies the minimum travelable vehicle speed as 28 km/h. Similarly, for the tenth stage, the forward gear stage selection unit 16 specifies the minimum travelable vehicle speed as 40 km/h. The forward gear stage selection unit 16 selects a gear stage having a highest speed among the minimum travelable vehicle speed specified for the gear stages including the tenth and lower stages and a low driving force characteristic, that is, the tenth stage, as the forward gear stage.

In the case where the travel mode of the vehicle V is the power mode, for each of the plurality of gear stages at which the vehicle can travel in the forward travel section, the forward gear stage selection unit 16 specifies a maximum travelable vehicle speed, which is a maximum speed among the speed at which the vehicle V can travel.

Specifically, in the case of power mode, for the driving force characteristic of each of the plurality of gear stages, the forward gear stage selection unit 16 specifies a maximum speed, among the speed of the vehicle V at which the driving force indicated by the driving force characteristic is equal to or greater than the travel characteristic indicated by the travel resistance characteristic corresponding to the forward travel section, as the maximum travelable vehicle speed. The forward gear stage selection unit 16 specifies a highest speed among the speed, at which the driving force indicated by the driving force characteristic and the travel resistance indicated by the travel resistance characteristic coincide with each other, as the maximum travelable vehicle speed. In a case where the driving force exceeds the travel resistance at each speed and thus the driving force and the traveling resistance do not coincide with each other, the forward gear stage selection unit 16 specifies a maximum speed of the vehicle V indicated by the driving force characteristic as the maximum travelable vehicle speed. For example, for the eighth stage, the forward gear stage selection unit 16 specifies the maximum travelable vehicle speed as 59 km/h.

The forward gear stage selection unit 16 selects a gear stage having a highest maximum travelable vehicle speed and a high driving force characteristic (a highest-speed travelable gear stage) among the plurality of gear stages as the forward gear stage. Thereby, the forward gear stage selection unit 16 can select the highest-speed travelable gear stage in the power mode.

For example, the forward gear stage selection unit 16 selects the tenth and lower stages as a travelable gear stage. For the ninth stage, the forward gear stage selection unit 16 specifies a lowest speed among the speed of the vehicle V, at which the driving force indicated by the driving force characteristic and the travel characteristic indicated by the travel resistance characteristic R corresponding to the forward travel section coincide with each other, as the maximum travelable vehicle speed. In the example shown in FIG. 5, the forward gear stage selection unit 16 specifies the maximum travelable vehicle speed as 87 km/h. Similarly, for the tenth stage, the forward gear stage selection unit 16 specifies the maximum travelable vehicle speed as 82 km/h. The forward gear stage selection unit 16 selects a gear stage having a highest speed among the maximum travelable vehicle speed specified for the gear stages including the tenth and lower stages and a high driving force characteristic, that is, the ninth stage, as the forward gear stage.

The shift control unit 17 calculates the speed at the time of entry into the forward travel section and the travel resistance of the vehicle V in the forward travel section. In order to calculate the speed at the time of entering the forward traveling section, the shift control unit 17 specifies the driving force of the vehicle V at the current speed by referring to the driving force characteristic information of the vehicle V stored in the storage unit 11. Further, the shift control unit 17 calculates the travel resistance at the current speed in the current travel section. The shift control unit 17 calculates the acceleration of the vehicle V based on a difference between the specified driving force and the traveling resistance and the total weight of the vehicle V acquired by the weight sensor 4. Here, in a case where the travel resistance exceeds the driving force of the vehicle V, the acceleration of the vehicle V becomes a negative value. The shift control unit 17 calculates a change amount of the speed of the vehicle V from the current position of the vehicle V to the start position of the forward travel section based on the calculated acceleration of the vehicle V and a remaining distance of the current travel section. In the embodiment, since the current travel section is assumed as an uphill section, the stall amount of the vehicle V is calculated. The shift control unit 17 subtracts the stall amount from the current speed of the vehicle V to calculate the speed of the vehicle V at the time of entering the forward travel section.

The shift control unit 17 estimates the travel resistance of the vehicle V in the forward travel section based on the road gradient in the forward travel section. The shift control unit 17 calculates the travel resistance characteristic of the forward travel section based on the rolling resistance of the drive wheel of the vehicle V, the air resistance of the vehicle V, and the gradient resistance of the forward travel section.

[Shift Control Based on Forward Gear Stage Selected by Forward Gear Stage Selection Unit 16]

When the vehicle V is positioned within a predetermined range from a border between the current travel section and the forward travel section, the shift control unit 17 controls shift of the gear stage of the vehicle V in the forward travel section based on the forward gear stage selected by the forward gear stage selection section 16.

Specifically, in a case where the forward gear stage selected by the forward gear stage selection unit 16 is lower than the current gear stage, the shift control unit 17 controls shift of the gear stage so as to perform downshift from the current gear stage, which is the current gear stage of the vehicle V, to the forward gear stage. Specifically the shift control unit 17 performs downshift from the current gear stage to the selected forward gear stage when the vehicle V is positioned within the predetermined range based on the start position of the forward travel section in the case where the forward gear stage is lower by two or more stages than the current gear stage.

The forward gear stage selection unit 16 tends to select a lower gear stage in the case where the travel mode of the vehicle V is the power mode than in the case of the economy mode. Therefore, in the case where the travel mode of the vehicle V is the power mode, as compared with the case of the economy mode, a frequency at which the forward gear stage selected by the forward gear stage selection unit 16 is lower by two or more stages than the current gear stage is increased, and a number of downshift control with the shift control unit 17 increases. In this way, the vehicle control device 10 can improve the traveling performance in the case where the travel mode of the vehicle V is the power mode as compared to the case of the economy mode.

[Shift Control Based on Current Gear Stage Selected by Current Gear Stage Selection Unit 13]

The shift control unit 17 controls shift of the gear stage of the vehicle V in the current travel section based on the current gear stage selected by the current gear stage selection unit 13. For example, in a case where the current gear stage selection unit 13 newly selects a target gear stage lower than the current gear stage while the vehicle is traveling in the current travel section at the current gear stage, the shift control unit 17 determines whether or not the vehicle V can travel in the forward travel section at the current gear stage. Specifically, the shift control unit 17 determines whether or not the vehicle V can travel in the forward travel section at the current gear stage based on whether or not a maximum value of the driving force corresponding to the current gear stage exceeds the travel resistance in the forward travel section.

Further, in a case where the vehicle V travels in the current travel section at the current gear stage, the shift control unit 17 calculates the stall amount of the vehicle V. Then, the shift control unit 17 determines whether or not the calculated stall amount is equal to or smaller than a predetermined threshold value. Here, the predetermined threshold value is a value set based on the current speed of the vehicle V. In a case where the vehicle can travel in the forward travel section at the current gear stage and the calculated stall amount is equal to or smaller than the predetermined threshold value, the shift control unit 17 controls shift of the gear stage of the transmission 2 so as to prevent downshift from the current gear stage to the target gear stage and to maintain the current gear stage. In a case where the vehicle cannot travel in the forward travel section at the current gear stage or the calculated stall amount is greater than the predetermined threshold value, the shift control unit 17 controls shift of the gear stage of the transmission 2 so as to perform downshift from the current gear stage to the target gear stage.

[Exception of Downshift Prevention]

The shift control unit 17 performs control related to exception of the downshift preventing control. In a case where the state of the vehicle V satisfies a predetermined condition, the shift control unit 17 controls shift of the gear stage of the transmission 2 so as to perform downshift to the target gear stage without preventing downshift even in a state in which downshift is prevented. Next, the exception of downshift prevention will be described in detail.

[Exception 1 of Downshift Prevention]

The shift control unit 17 calculates a rotational speed of the engine 1 that is the lowest in the case where the vehicle V travels in the current travel section at the current gear stage. Here, the speed at the time of entering the forward travel section of the vehicle V is the minimum speed of the vehicle V in the current travel section. The shift control unit 17 calculates a rotational speed of the engine 1 that is the lowest in the case where the vehicle V travels in the current travel section at the current gear stage based on the minimum speed of the vehicle V in the current travel section. In a case where the calculated rotational speed is lower than the predetermined value, the shift control unit 17 controls shift of the gear stage of the transmission 2 so as to perform downshift to the target gear stage without preventing downshift. In this way, the vehicle control device 10 does not change the gear stage even though the rotational speed of the engine 1 is excessively low in the current travel section, and thus can prevent a sense of discomfort to the driver.

[Exception 2 of Downshift Prevention]

The shift control unit 17 calculates the minimum speed of the vehicle V in the current travel section based on the speed of the vehicle V and the stall amount of the vehicle V in the current travel section. Then, in a case where the minimum speed is lower than an allowance speed higher than the minimum speed at which the vehicle V can travel in the forward travel section among the speed of the vehicle V corresponding to the current gear stage, the shift control unit 17 controls shift of the gear stage so as to perform downshift to the target gear stage without preventing downshift.

Hereinafter, an example in which the shift control unit 17 performs control without performing downshift based on the minimum speed of the vehicle V in the current travel section and the allowance speed will be described. First, the shift control unit 17 calculates the minimum speed of the vehicle V in the current travel section. Here, the minimum speed of the vehicle V is the speed at the time of entering the forward travel section. Therefore, the shift control unit 17 sets the calculated speed of the vehicle V at the time of entering the forward travel section as the minimum speed of the vehicle V in the current travel section.

The shift control unit 17 specifies the minimum speed at which the vehicle V can travel in the forward travel section among the speed of the vehicle V corresponding to the current gear stage. Specifically, the shift control unit 17 specifies the minimum speed of the vehicle V at which the vehicle V can travel at the current gear stage based on the travel performance characteristic indicating the relationship between the speed and the driving force of the vehicle V corresponding to the current gear stage indicated by the driving force characteristic information of the vehicle V and the calculated travel resistance of the forward travel section. Here, the minimum speed is a low speed among the speed at which the driving force in the current gear stage and the traveling resistance in the forward traveling section are equal.

The shift control unit 17 calculates the allowance speed that is higher by a predetermined speed than the minimum speed of the vehicle V at which the vehicle V can travel at the current gear stage. Here, the predetermined speed is, for example, 5% higher than the minimum speed. In a case where the minimum speed of the vehicle V in the current travel section is lower than the allowance speed, the shift control unit 17 controls shift of the gear stage so as to downshift to the target gear stage without preventing downshift. In this way, the vehicle control device 10 can prevent the speed from being lowered more than expected in the forward travel section, whereby travel at the current gear stage cannot be maintained.

[Exception 3 of Downshift Prevention]

In a case where the vehicle is traveling with a kickdown switch that permits kickdown in an ON state, the shift control unit 17 controls shift of the gear stage of the transmission 2 so as to perform downshift from the current gear stage to the target gear stage without preventing downshift. Further, in a case where the vehicle V is traveling in the automatic cruise mode, when the accelerator opening degree detected by the accelerator opening degree sensor 6 is equal to or greater than a predetermined opening degree, the shift control unit 17 controls shift of the gear stage of the transmission 2 so as to downshift from the current gear stage to the target gear stage without preventing downshift. Here, the predetermined opening is, for example, an opening degree of 80% of a maximum opening degree. In this way, the vehicle control device 10 can perform downshift while prioritizing an intention of the driver of the vehicle V to depress the accelerator and accelerate the vehicle V.

The shift control unit 17 may control shift of the gear stage of the transmission 2 so as to perform downshift from the current gear stage to the target gear stage when it is detected that the opening degree of the accelerator detected by the accelerator opening degree sensor 6 changes from an opening degree smaller than a first opening degree to an opening degree larger than a second opening degree within a predetermined time (for example, 3 seconds). Here, the first opening degree is, for example, an opening degree of 10% of the maximum opening degree, and the second opening degree is, for example, 80% of the maximum opening degree.

[Exception 4 of Downshift Prevention]

In a case where the forward gear stage selected by the forward gear stage selection unit 16 is lower than the current gear stage, the shift control unit 17 controls shift of the gear stage of the transmission 2 so as to perform downshift from the current gear stage to the target gear stage without preventing the downshift. Here, the forward gear stage selection unit 16 tends to select a lower gear stage in the case where the travel mode of the vehicle V is the power mode than in the case of the economy mode. Therefore, in the case where the travel mode of the vehicle V is the power mode, as compared with the case of the economy mode, a frequency at which the forward gear stage selected by the forward gear stage selection unit 16 is lower by one or more stages than the current gear stage is increased, and a number of times without performing downshift prevention with the shift control unit 17 increases. In this way, the vehicle control device 10 can improve the traveling performance in the case where the travel mode of the vehicle V is the power mode as compared to the case of the economy mode.

[Processing Flow of Early Downshift Control]

Figure 6:
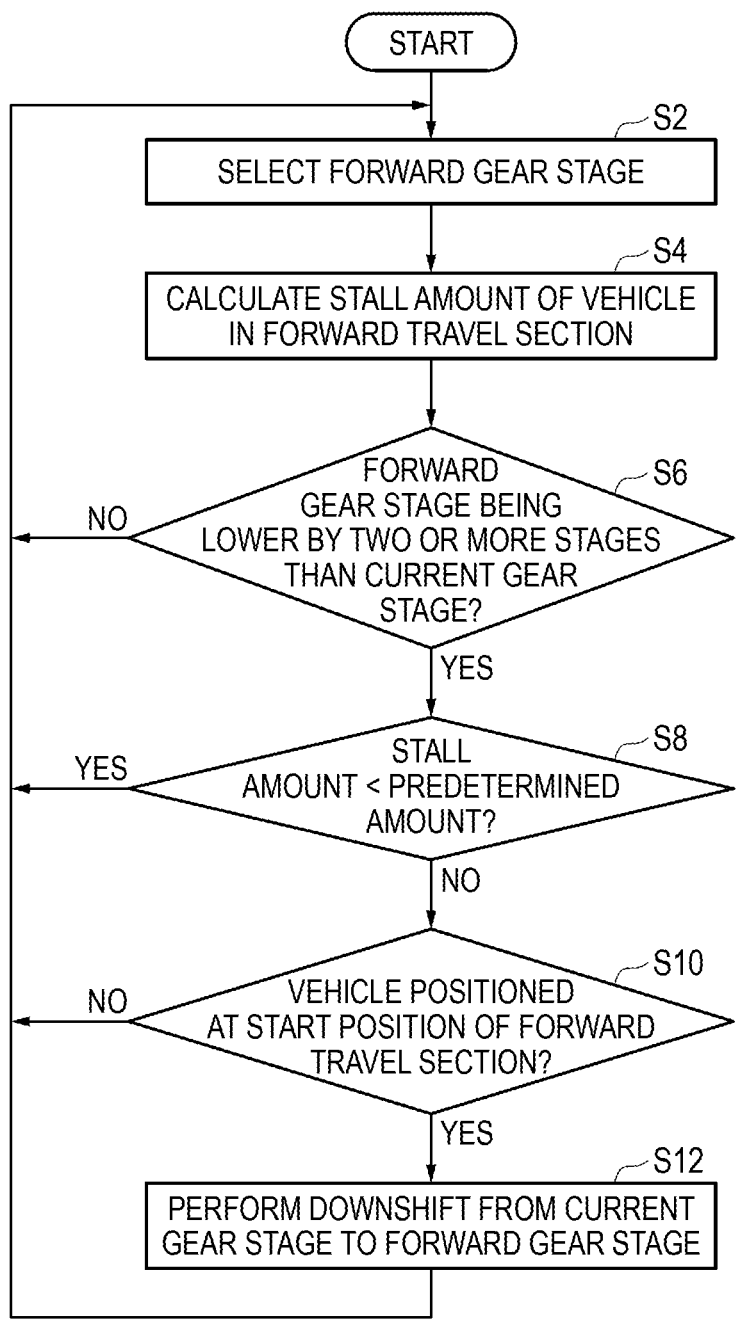
FIG. 6 is a flowchart for explaining a flow of a processing related to early downshift control that is executed by the vehicle control device according to the embodiment.

Next, a processing flow of shift control according to an embodiment will be described. First, a processing flow of shift control based on the forward gear stage will be described. FIG. 6 is a flowchart for explaining the flow of the processing related to early downshift control that is executed by the vehicle control device 10 according to the embodiment. The processing of this flowchart is assumed to be started in response to start of travel of the vehicle V. The processing of this flowchart is assumed to be performed continuously while the vehicle V is traveling.

The forward gear stage selection unit 16 selects the forward gear stage (S2). The shift control unit 17 calculates the stall amount of the vehicle V in the forward travel section (S4).

The shift control unit 17 determines whether or not the forward gear stage selected by the forward gear stage selection unit 16 is lower than the current gear stage by two or more stages (S6). In a case one or less stages (NO in S6), the shift control unit 17 proceeds to S2.

In a case lower by two or more stages (YES in S6), the shift control unit 17 determines whether or not the stall amount of the vehicle V in the forward travel section is lower than a predetermined amount (S8). In a case lower than the predetermined amount (YES in S8), the shift control unit 17 proceeds to S2.

In a case equal to or greater than the predetermined amount (No in S8), the shift control unit 17 determines whether or not the vehicle V is positioned at the start position of the forward travel section (S10). If the vehicle V is not positioned at the start position of the forward travel section (NO in S10), the shift control unit 17 proceeds to S2.

In a case where the vehicle V is positioned at the start position of the forward travel section (YES in S10), the shift control unit 17 performs downshift down from the current gear stage to the forward gear stage (S12).

[Processing Flow of Downshift Prevention Control]

Figure 7:
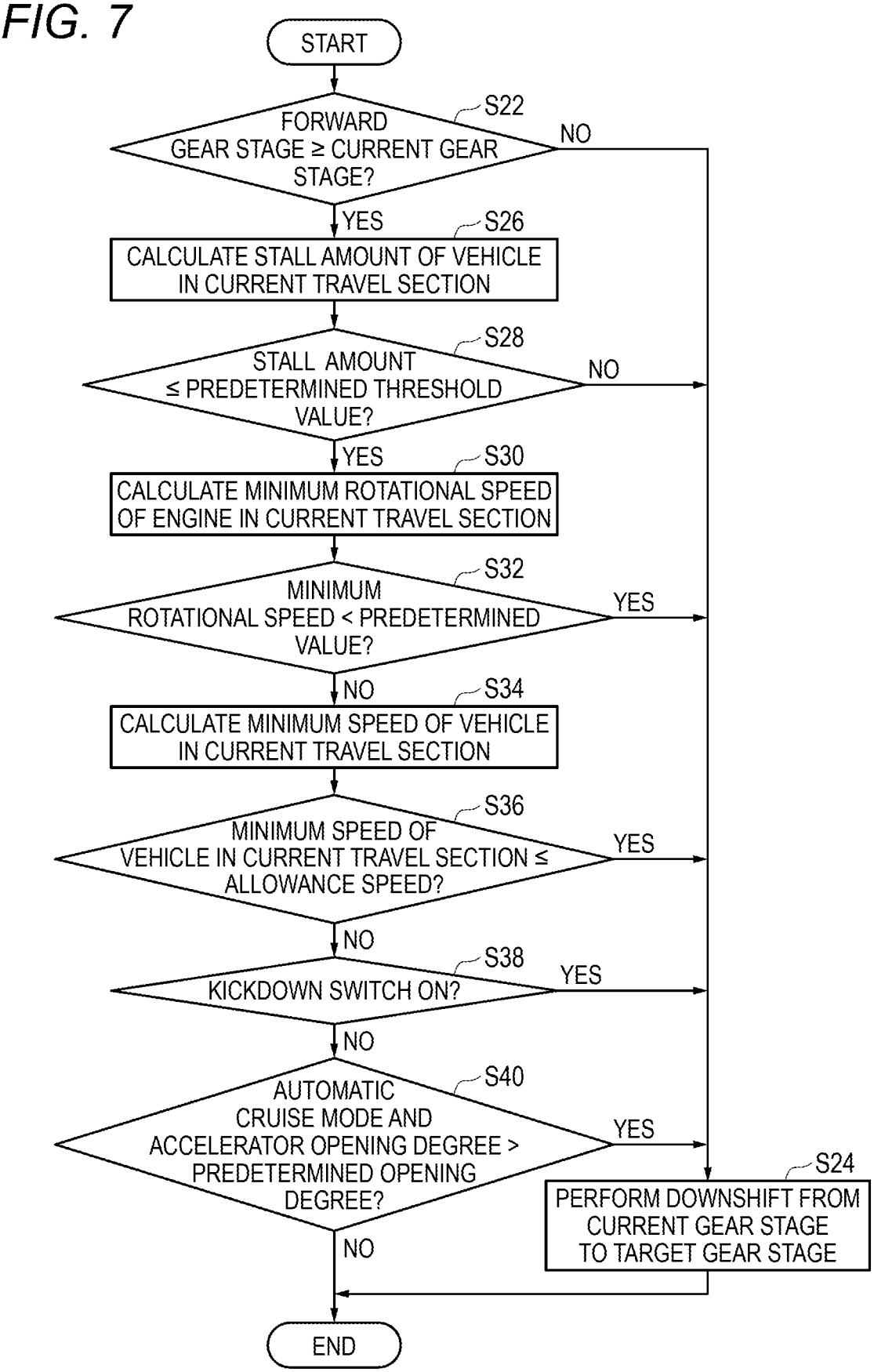
FIG. 7 is a flowchart for explaining a flow of a processing related to downshift preventing control that is executed by the vehicle control device according to the embodiment.

Next, a processing flow of downshift control according to an embodiment will be described. FIG. 7 is a flowchart for explaining the flow of the processing related to downshift preventing control that is executed by the vehicle control device 10 according to the embodiment. The processing in this flowchart is started when the current gear stage selection unit 13 newly selects the target gear stage lower than the current gear stage.

The shift control unit 17 determines whether or not the forward gear stage selected by the forward gear stage selection unit 16 is equal to or higher than the current gear stage (S22). In a case where the forward gear stage is equal to or higher than the current gear stage (YES in S22), the shift control unit 17 proceeds to S26. In a case where the forward gear stage is lower than the current gear stage (NO in S22), the shift control unit 17 proceeding to the S24 and controls shift of the gear stage of the transmission 2 so as to perform downshift from the current gear stage to the target gear stage.

The shift control unit 17 calculates the stall amount of the vehicle V in the current travel section (S26). The shift control unit 17 determines whether or not the calculated stall amount is equal to or smaller than a predetermined threshold value (S28). In a case greater than the predetermined threshold value (NO in S28), the shift control unit 17 controls shift of the gear stage of the transmission 2 so as to perform downshift from the current gear stage to the target gear stage (S24). In a case equal to or smaller than the predetermined threshold value (YES in S28), the shift control unit 17 proceeds to S30.

The shift control unit 17 calculates the minimum rotational speed of the engine 1 of the vehicle V in the current travel section (S30). The shift control unit 17 determines whether or not the calculated minimum rotational speed of the engine 1 is less than a predetermined value (S32). In a case less than the predetermined value (YES in S32), the shift control unit 17 proceeding to the S24 and controls shift of the gear stage of the transmission 2 so as to perform downshift from the current gear stage to the target gear stage. In a case equal to or greater than the predetermined value (NO in S32), the shift control unit 17 proceeds to S34.

First, the shift control unit 17 calculates the minimum speed of the vehicle V in the current travel section (S34). The shift control unit 17 determines whether or not the minimum speed of the vehicle V in the current travel section is equal to or smaller than the allowance speed (S36). In a case where the minimum speed of the vehicle V in the current travel section is equal to or smaller than the allowance speed (YES in S36), the shift control unit 17 proceeds to S24. That is, the shift control unit 17 controls shift of the gear stage of the transmission 2 so as to perform downshift from the current gear stage to the target gear stage without performing downshift prevention.

In a case where the minimum speed of the vehicle V in the current travel section is greater than the allowance speed (NO in S36), the shift control unit 17 determines whether or not the kickdown switch is ON (S38). In a case where the kickdown switch is ON (YES in S38), the shift control unit 17 proceeds to S24. That is, the shift control unit 17 controls shift of the gear stage of the transmission 2 so as to perform downshift. In a case where the kickdown switch is OFF (NO in S38), the shift control unit 17 proceeds to S40.

The shift control unit 17 determines whether or not the vehicle V is in the automatic cruise mode and the accelerator opening degree detected by the accelerator opening degree sensor 6 is greater than the predetermined opening degree (S40). In a case where the vehicle is in the automatic cruise mode and the accelerator opening degree is greater than the predetermined opening degree (YES in S40), the shift control unit 17 proceeds to S24. That is, the shift control unit 17 controls shift of the gear stage of the transmission 2 so as to perform downshift from the current gear stage to the target gear stage without performing downshift prevention.

In a case where the vehicle V is not in the automatic cruise mode or in a case where the opening degree of the accelerator is equal to or smaller than the predetermined opening degree (NO in S40), the shift control unit 17 ends the process of this flowchart. That is, the shift control unit 17 controls shift of the gear stage of the transmission 2 so as to perform downshift prevention.

Effects of the Present Embodiment

As described above, in a case where the state of the vehicle V satisfies the predetermined condition, the vehicle control device 10 according to the present embodiment controls shift of the gear stage so as to perform downshift from the current gear stage to the target gear stage without preventing the downshift even in a state in which the downshift is prevented. In this way, the vehicle control device 10 can cause the vehicle V to travel in a state in which the speed of the vehicle V can be recovered quickly. In addition, in a case where the predetermined condition is not satisfied, the vehicle control device 10 prevents downshift so that the number of gear shift can be reduced to improve the fuel efficiency.

The forward gear stage selection unit 16 of the vehicle control device 10 selects the gear stage in different manners in the economy mode and in the power mode, and thus can select the gear stages suitable for the economy mode and the power mode. As a result, in the power mode, a situation in which the vehicle V selects a lower gear as the forward gear increases as compared with a case where the vehicle V is traveling in the economy mode, and thus the frequency of the downshift prevention is reduced. As a result, in the vehicle V, the number of times that the condition for preventing downshift is satisfied is reduced, and downshift is performed. As a result, the vehicle V can travel with importance on the travel performance. In addition, since a situation in which a high gear is selected increases in the economy mode, the frequency of downshift prevention increases, and the vehicle V can travel with importance on the fuel efficiency.

Although the present disclosure has been described using embodiments, the technical scope of the present disclosure is not limited to the scope described in the above embodiment, and various modifications and changes can be made without departing from the scope thereof. For example, a specific embodiment of distributing and integrating devices is not limited to the above embodiment, and all or a part thereof may be configured to be functionally or physically distributed and integrated in arbitrary units. New embodiments generated from any combination of a plurality of embodiments are also included in embodiments of the present disclosure. Effects of the new embodiments generated from the combinations include effects of the original embodiments.

This application is based on the Japanese Patent Application (2017-095970), filed May 12, 2017, the contents of which are incorporated herein by reference.

INDUSTRIAL APPLICABILITY

The vehicle control device of the present disclosure is useful in being capable of selecting a gear stage suitable for a travel mode of a vehicle.

REFERENCE SIGNS LIST

1 Engine
2 Transmission
3 GPS sensor
4 Weight sensor
5 Speed sensor
6 Accelerator opening degree sensor
10 Vehicle control device
11 storage unit
12 control unit
13 Current gear stage selection unit
14 Road gradient acquisition unit
15 Travel section determination unit
16 Forward gear stage selection unit
17 Shift control unit
V Vehicle

The invention claimed is:

1. A vehicle control device comprising:
a travel section determination unit configured to determine a forward travel section that is a travel section having a different road gradient from a current travel section in which a vehicle is currently traveling and that is ahead in a travel direction of the vehicle;
a forward gear stage selection unit configured to select a forward gear stage, which is a gear stage of the vehicle in the forward travel section, based on: a driving force characteristic indicating a relationship between a speed of the vehicle and a driving force of the vehicle of each of a plurality of gear stages of the vehicle; and a travel resistance characteristic indicating a relationship between the speed of the vehicle and a travel resistance of the vehicle corresponding to the forward travel section; and
a shift control unit configured to control shift of the gear stage of the vehicle in the forward travel section based on the forward gear stage selected by the forward gear stage selection unit,
wherein in a case where a travel mode of the vehicle is a first mode in which suppression of fuel consumption is prioritized, the forward gear stage selection unit is configured to select as the forward gear stage a gear stage at which a minimum travelable vehicle speed, which is a minimum speed among the speed of the vehicle at which the driving force indicated by the driving force characteristic is equal to or greater than the travel resistance indicated by the travel resistance characteristic, is highest, and in a case where the travel mode of the vehicle is a second mode in which improvement of travel performance is prioritized, the forward gear stage selection unit is configured to select as the forward gear stage a gear stage at which a maximum travelable vehicle speed, which is a maximum speed among the speed of the vehicle at which the driving force indicated by the driving force characteristic is equal to or greater than the travel resistance indicated by the travel resistance characteristic, is highest.

2. The vehicle control device according to claim 1,
wherein, in a case where the forward gear stage selected by the forward gear stage selection unit is lower than a current gear stage which is a gear stage of the vehicle in a current travel state of the vehicle and when the vehicle is positioned within a predetermined range with respect to a start position of the forward travel section, the shift control unit is configured to control shift of the gear stage so as to downshift from the current gear stage to the forward gear stage.

3. The vehicle control device according to claim 1, further comprising:

a current gear stage selection unit configured to select a current gear stage, which is a gear stage of the vehicle in a current travel state of the vehicle, based on the travel resistance of the vehicle, wherein in a case where the current gear stage selection unit newly selects a target gear stage lower than the current gear stage while the vehicle is traveling in the current travel section at the current gear stage, the shift control unit is configured to:

control shift of the gear stage so as to prevent downshift from the current gear stage to the target gear stage and to maintain the current gear stage, when the driving force of the vehicle corresponding to the current gear stage exceeds the travel resistance of the vehicle in the forward travel section so that the vehicle is capable of traveling in the forward travel section at the current gear stage and a stall amount of the vehicle in a case where the vehicle travels in the current travel section at the current gear stage is equal to or smaller than a predetermined threshold value, and control shift of the gear stage so as to downshift from the current gear stage to the target gear stage without preventing the downshift in a case where the forward gear stage selected by the forward gear stage selection unit is lower than the current gear stage.

* * * * *